United States Patent
Ota et al.

(10) Patent No.: US 10,050,282 B2
(45) Date of Patent: Aug. 14, 2018

(54) OXYGEN REDUCTION CATALYST AND PRODUCTION METHOD THEREFOR

(71) Applicant: National University Corporation Yokohama National University, Kanagawa (JP)

(72) Inventors: Kenichiro Ota, Kanagawa (JP); Akimitsu Ishihara, Kanagawa (JP); Shigenori Mitsushima, Kanagawa (JP); Makoto Hamazaki, Kanagawa (JP)

(73) Assignee: National University Corporation Yokohama National University, Kanagawa (JP)

( * ) Notice: Subject to any disclaimer, the term of this patent is extended or adjusted under 35 U.S.C. 154(b) by 0 days.

(21) Appl. No.: 15/127,962

(22) PCT Filed: Feb. 27, 2015

(86) PCT No.: PCT/JP2015/055966
§ 371 (c)(1),
(2) Date: Sep. 21, 2016

(87) PCT Pub. No.: WO2015/146490
PCT Pub. Date: Oct. 1, 2015

(65) Prior Publication Data
US 2017/0098830 A1    Apr. 6, 2017

(30) Foreign Application Priority Data
Mar. 25, 2014  (JP) ................. 2014-062643

(51) Int. Cl.
*H01M 4/90* (2006.01)
*B01J 21/06* (2006.01)
(Continued)

(52) U.S. Cl.
CPC ........... *H01M 4/9016* (2013.01); *B01J 21/06* (2013.01); *B01J 23/20* (2013.01); *B01J 37/18* (2013.01); *H01M 2004/8689* (2013.01)

(58) Field of Classification Search
CPC ........ B01J 21/063; B01J 21/066; B01J 23/20; B01J 37/18; H01M 4/9016
See application file for complete search history.

(56) References Cited

U.S. PATENT DOCUMENTS 7,670,712 B2 * 3/2010 Ota ................. H01M 4/90
429/493
7,767,330 B2 * 8/2010 Merzougui .......... H01M 4/86
429/524

(Continued)

FOREIGN PATENT DOCUMENTS

GB        2506268 A      3/2014
JP     2009-148706 A    7/2009
(Continued)

OTHER PUBLICATIONS

International Search Report and Written Opinion dated Apr. 28, 2015 in corresponding PCT application No. PCT/JP2015/055966.
(Continued)

*Primary Examiner* — Cam N. Nguyen
(74) *Attorney, Agent, or Firm* — Nields, Lemack & Frame, LLC

(57) ABSTRACT

The present invention provides a novel oxygen reduction catalyst having a good stability and a high oxygen reduction performance. The oxygen reduction catalyst includes: a conductive oxide; and an oxide(s), having oxygen holes and provided at least on the surface of the conductive oxide, of at least one or more transition metals selected from the group consisting of Ti, Zr, Nb and Ta.

8 Claims, 7 Drawing Sheets

(51) Int. Cl.
   *B01J 23/20*   (2006.01)
   *B01J 37/18*   (2006.01)
   *H01M 4/86*    (2006.01)

(56) References Cited

U.S. PATENT DOCUMENTS

| | | | |
|---|---|---|---|
| 9,614,228 B2* | 4/2017 | Hayden | B01J 23/42 |
| 9,748,580 B2* | 8/2017 | Ota | H01M 4/8673 |
| 9,837,668 B2* | 12/2017 | Cerri | H01M 4/8657 |
| 9,947,936 B2* | 4/2018 | Tezuka | H01M 4/9041 |
| 2010/0279202 A1 | 11/2010 | Ota et al. | |
| 2013/0192985 A1* | 8/2013 | Hattori | H01M 4/8652 |
| | | | 204/290.12 |
| 2013/0302705 A1 | 11/2013 | Yoshida et al. | |
| 2014/0011102 A1 | 1/2014 | Ota et al. | |

FOREIGN PATENT DOCUMENTS

| | | |
|---|---|---|
| JP | 2012-200643 A | 10/2012 |
| WO | 2009/060777 A1 | 5/2009 |
| WO | 2012/128287 A1 | 9/2012 |
| WO | 2013/141063 A1 | 9/2013 |
| WO | 2014/020349 A1 | 2/2014 |

OTHER PUBLICATIONS

International Preliminary Report on Patentability dated Sep. 27, 2016 in corresponding PCT application No. PCT/JP2015/055966.

Lee et al., "Stability and Electrocatalytic Activity for Oxygen Reduction in WC + Ta Catalyst," Electrochimica Acta, vol. 49, pp. 3479-3485, 2004.

Ishihara et al., "Tantalum Oxynitride for a Novel Cathode of PEFC," Electrochemical and Solid-State Letters, vol. 8, pp. A201-A203, 2005.

Imai et al., "Structural defects working as active oxygen-reduction sites in partially oxidized Ta-carbonitride core-shell particles probed by using surface-sensitive conversion-electron-yield x-ray absorption spectroscopy," Applied Physics Letters, vol. 96, 2010.

Tamura et al., "Catalytic activity of partially oxidized tantalum carbonitride for oxygen reduction reaction," Abstracts of 2007 Fall Meeting of the Electrochemical Society of Japan, p. 12, 2007.

Ishihara et al., "Partially Oxidized Tantalum Carbonitrides as a New Nonplatinum Cathode for PEFC-1-," Journal of the Electrochemical Society, vol. 155, Iss.4, pp. B400-B406, 2008.

Arashi et al., "Research of Polymer Electrolyte Fuel Cells with Metal Oxides," Abstracts of 33rd Annual Meeting of Hydrogen Energy Systems Society of Japan, pp. 13-16, 2013.

* cited by examiner

OXYGEN REDUCTION CATALYST AND PRODUCTION METHOD THEREFOR

TECHNICAL FIELD

The present invention relates to an oxygen reduction catalyst to promote the oxygen reduction reaction in an aqueous solution, in particular, an oxygen reduction catalyst used for an air electrode in an electrochemical device such as a fuel cell or an air cell, and a method for producing the same.

BACKGROUND ART

A fuel cell or an air cell is an electrochemical energy device which uses as an oxidant, for example, the oxygen in the air, and takes out as electrical energy the energy generated by the chemical reaction between a compound to be a fuel and a negative electrode active material. A fuel cell or an air cell has an higher theoretical energy capacity than the theoretical energy capacities of secondary batteries such as Li-ion batteries, and can be used as in-vehicle electric power supplies, stationary distributed electric power supplies at homes and factories, or electric power supplies for portable electronic devices.

On the oxygen electrode side in a fuel cell or an air cell, an electrochemical reaction reducing oxygen occurs. The oxygen reduction reaction hardly proceeds at relatively low temperatures, and in general, the reaction can be promoted by a noble metal catalyst such as platinum (Pt). However, the energy conversion efficiency of fuel cells or air cells is still not sufficient. The oxygen reduction reaction occurs in a high electric potential region, and hence even a noble metal such as Pt is degraded by dissolution, to lead to a problem concerning the securement of long-term stability and reliability. In addition, a catalyst mainly composed of a noble metal such as Pt is expensive, to boost the price of the whole system of a fuel cell or an air cell to limit the widespread use of the cell concerned. Accordingly, the development of an inexpensive catalyst not using a noble metal such as platinum and having a high oxygen reduction ability is demanded.

As a catalyst not containing Pt, there have been known, for example, organometallic complexes, carbon nitride, transition metal chalcogenides, transition metal carbides and transition metal nitrides; however, any of these is insufficient with respect to catalytic activity or durability not to produce performance beyond the performance of the Pt-based catalysts.

Non Patent Literature 1 and Non Patent Literature 2 disclose that among these, part of the oxides of the group 4 and group 5 elements of transition metals have activity for oxygen reduction reaction. In addition, Non Patent Literature 3 and Patent Literature 1 have pointed out the possibility that part of the structural defects function as active sites for the oxygen reduction reaction. Moreover, Non Patent Literature 4, Non Patent Literature 5 and Patent Literature 1 disclose that conductive carbon or the like is imparted during the constitution of electrodes.

The oxygen reduction reaction on the air electrode catalyst of a fuel cell or an air cell is a reaction involving the electron transfer from the electrode, and accordingly, in order to obtain a good oxygen reduction catalyst performance, electrons are required to rapidly move from an electrode to the vicinity of the reaction active site on the catalyst. Oxygen or proton, which is a reactant, is required to be rapidly delivered to the reaction active site. However, in general, the oxides of the group 4 and group 5 elements of transition metals described in Non Patent Literature 1 to Non Patent Literature 3 and Patent Literature 1 have insulator-like electronic states and accordingly are poor in electrical conductivity, and hardly undergo rapid reaction. Consequently, although a relatively high performance is exhibited when the cell is operated at a low electric current value, in a high electric current region, there occurs a problem that the operating voltage is lowered.

Even with the method described in Non Patent Literature 4 and Non Patent Literature 5 and Patent Literature 1, it is difficult to construct/control at a nano level an effective electron conduction path in the vicinity of the active sites, so as for the performance to remain in a low state. The introduction of a large amount of conductive carbon disturbs the supply of oxygen to the catalytic active sites; it is demanded to improve the oxygen reduction performance by allowing the imparting of electrical conductivity and the effective transport of oxygen to be compatible with each other.

For such problems, Patent Literature 2 discloses a technique to improve the electrical conductivity of the surface by introducing oxygen defects into the transition metal oxide, or by introducing oxygen defects into the transition metal oxide and by substituting part of oxygen atoms with nitrogen atoms. And, the oxygen reduction performance is improved by disposing conductive carbon in the vicinity of the structural defects to be the active sites for the oxygen reduction reaction and thus introducing good conduction paths.

Moreover, Non Patent Literature 6 discloses a technique for preparing niobium-added titanium oxide ($TiO_2$:Nb) in which a solution obtained by dissolving $NbCl_5$ and $TiCl_4$ in ethanol was dropwise added to and impregnated into mesoporous $C_3N_4$, then the mesoporous $C_3N_4$ is calcined to decompose $C_3N_4$ into nitride nanoparticles, and then the nitride is oxidized to prepare the niobium-added titanium oxide ($TiO_2$:Nb). The niobium-added titanium oxide ($TiO_2$:Nb) is described to be useful as a platinum alternative catalyst because the niobium-added titanium oxide ($TiO_2$:Nb) is stable and holds good electrical conductivity even after the oxidation.

CITATION LIST

Patent Literature

[Patent Literature 1] Japanese Patent Laid-Open No. 2009-148706
[Patent Literature 2] Japanese Patent Laid-Open No. 2012-200643

Non Patent Literature

[Non Patent Literature 1] K. Lee, et al., Electrochim. Acta, 49, 3479 (2004)
[Non Patent Literature 2] A. Ishihara, et al., Electrochem. Solid-State Lett., 8, A201 (2005)
[Non Patent Literature 3] H. Imai et al., APPLIED PHYSICS LETTERS, 96, 191905 2010
[Non Patent Literature 4] Abstracts of 2007 Fall Meeting of the Electrochemical Society of Japan, p. 12 (2007)
[Non Patent Literature 5] Journal of The Electrochemical Society, 155(4), B400-B406 (2008)
[Non Patent Literature 6] Abstracts of 33rd Annual Meeting of Hydrogen Energy Systems Society of Japan, p. 13-16 (2013)

SUMMARY OF INVENTION

Technical Problem

However, in addition to the techniques disclosed in Patent Literature 2 and Non Patent Literature 6 as useful platinum alternative catalysts, further novel oxygen reduction catalysts have been longed for.

The present invention has been achieved in view of such problems as described above, and an object of the present invention is to provide a novel oxygen reduction catalyst having a good stability and a high oxygen reduction performance.

Solution to Problem

The present inventors made a diligent study, and consequently have found that the stability and the oxygen reduction performance of the oxygen reduction catalyst are made good by using as a base material a conductive oxide having a higher stability against carbon, and by providing the oxide(s), having oxygen holes, of at least one or more transition metals selected from the group consisting of Ti, Zr, Nb and Ta on the surface to function as the active sites for the oxygen reduction reaction.

In other words, the present invention is, in an aspect thereof, an oxygen reduction catalyst including a conductive oxide and an oxide(s), having oxygen holes and provided at least on the surface of the conductive oxide, of at least one or more transition metals selected from the group consisting of Ti, Zr, Nb and Ta.

In the oxygen reduction catalyst according to the present invention, in an embodiment, the transition metal oxide is represented by $TiO_{2-x}$, $ZrO_{2-x}$, $NbO_{2-x}$, or $TaO_{2-x}$, with the proviso that $0 < x \leq 0.2$.

In the oxygen reduction catalyst according to the present invention, in another embodiment, the conductive oxide is an oxide(s) of at least one or more transition metals selected from the group consisting of Ti, Zr, Nb and Ta.

In the oxygen reduction catalyst according to the present invention, in yet another embodiment, the conductive oxide is $Ti_4O_7$, $Ti_3O_5$, $Ti_2O_3$, $TiO$, $Ti_3O_2$, $ZrO$, $NbO$ or $TaO$.

In the oxygen reduction catalyst according to the present invention, in still yet another embodiment, the conductive oxide and the transition metal oxide are formed so as to form a composite substance.

The present invention is, in another aspect, a fuel cell including the oxygen reduction catalyst of the present invention as an air electrode.

The present invention is, in yet another aspect, an air cell including the oxygen reduction catalyst of the present invention as an air electrode.

The present invention is, in still yet another aspect, a method for producing an oxygen reduction catalyst, including mixing 5 to 50% by mass of an oxide selected from the group consisting of the oxides of Ti, Zr, Nb and Ta with 50 to 95% by mass of a conductive oxide so as to be supported at least on the surface of the conductive oxide to prepare a mixture, and then performing a heat treatment of the mixture in an inert gas atmosphere of 1 to 100% of hydrogen at 800 to 1300° C.

Advantageous Effect of Invention

According to the present invention, a novel oxygen reduction catalyst having a good stability and a high oxygen reduction performance can be provided.

Figure 1:
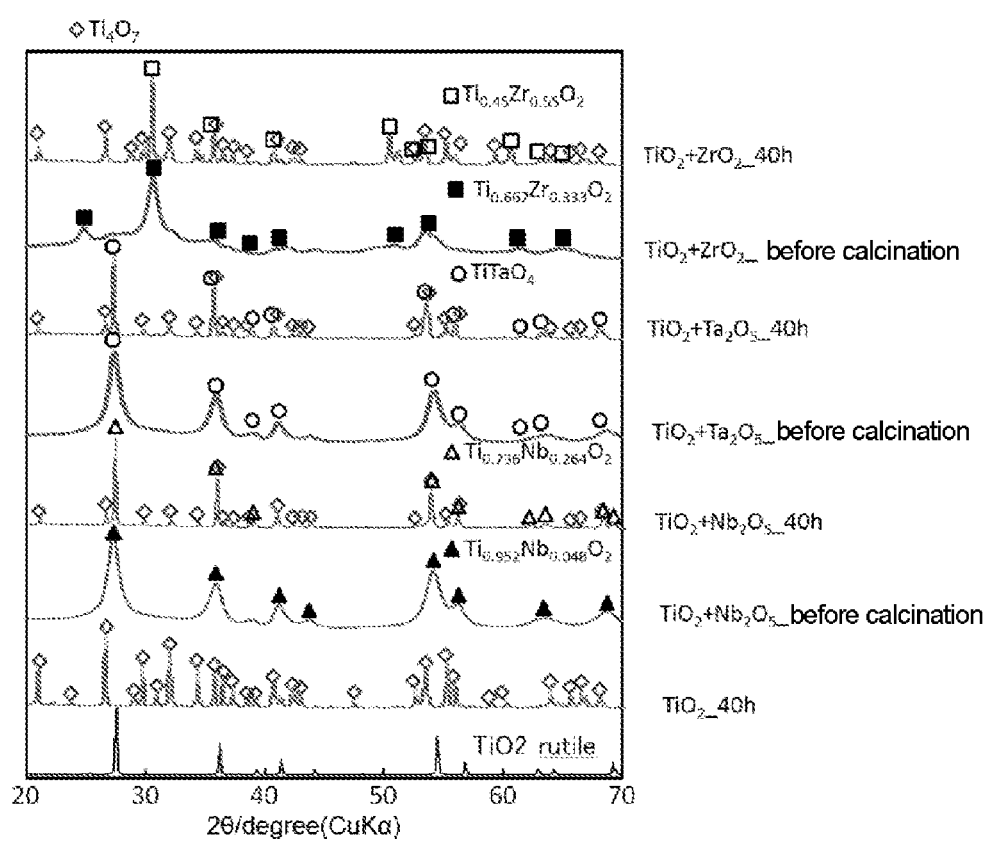
FIG. 1 is a chart showing the measurement results of the powder X-ray diffraction in the oxygen reduction ability evaluation test 1 of respective catalysts in Example.

DESCRIPTION OF EMBODIMENTS (Constitution of Oxygen Reduction Catalyst)

The oxygen reduction catalyst according to the present embodiment includes a conductive oxide and an oxide(s), having oxygen holes and provided at least on the surface of the conductive oxide, of at least one or more transition metals selected from the group consisting of Ti, Zr, Nb and Ta. In the oxygen reduction catalyst according to the present embodiment, the conductive oxide can function as a base material, and has a good stability to a material such as carbon while having electrical conductivity. At least on the surface of the conductive oxide, an oxide(s), having oxygen holes, of at least one or more transition metals selected from the group consisting of Ti, Zr, Nb and Ta is provided, and hence the oxygen holes effectively function as the active sites of the oxygen reduction reaction. The conductive oxide is present in the vicinity of the oxygen holes to be the active sites, accordingly the conductive oxide forms a conduction path, and thus can improve the oxygen reduction performance. Moreover, in the present invention, as the oxides of the transition metals, the oxides of the group 4 and group 5 elements, Ti, Zr, Nb and Ta are used, and accordingly the oxygen holes functioning as the active sites of the oxygen reduction reaction are easily formed, to lead to a good production efficiency.

In the oxygen reduction catalyst according to the present embodiment, the oxide of the transition metal may be an oxide represented by $TiO_{2-x}$, $ZrO_{2-x}$, $NbO_{2-x}$, or $TaO_{2-x}$, with the proviso that $0<x\leq0.2$. As the oxides of Ti, Zr, Nb and Ta, the higher-order oxides $TiO_2$, $ZrO_2$, $Nb_2O_5$ and $Ta_2O_5$ exist, but these are insulators. As the oxides of Ti, Zr, Nb and Ta, the lower-order $Ti_4O_7$, ZrO, NbO and TaO exist; however, these have electrical conductivity, but when these are used for the oxygen reduction catalyst, these instantly react with oxygen and the reactions are completed to that extent, and the oxygen reduction reaction does not occur. In other words, these lower order $Ti_4O_7$, ZrO, NbO and TaO are low in the oxygen reduction activity. Accordingly, in the present embodiment, used are the intermediate oxides ($0<x\leq0.2$) represented by $TiO_{2-x}$, $ZrO_{2-x}$, $NbO_{2-x}$, and $TaO_2$, between these higher order $TiO_2$, $ZrO_2$, $Nb_2O_5$ and $Ta_2O_5$ and the lower order $Ti_4O_7$, ZrO, NbO and TaO. The oxides concerned are not the higher order oxides such as $TiO_2$, $ZrO_2$, $Nb_2O_5$ and $Ta_2O_5$, and are provided with oxygen holes functioning as the active sites of the oxygen reduction reaction while having certain degree of electrical conductivity to lead to a good oxygen reduction reactivity.

In the present invention, the oxides of the transition metals Ti, Zr, Nb and Ta, having oxygen holes mean the oxides in the state in which oxygen atoms are deficient from the highest oxide states of the transition metals Ti, Zr, Nb and Ta. The amount of the oxygen holes can be calculated from, for example, the elemental analysis based on the inert gas melt infrared absorption method, and the occurrence or nonoccurrence of the oxygen holes can also be determined by this method.

With respect to the transition metal oxides having oxygen holes, the properties of the oxygen reduction catalysts are compared with each other in the case where the oxides of the transition metals Ti, Zr, Nb and Ta are each used alone. As the transition metal oxides having oxygen holes, in the order of (1) the oxide of Ti or the oxide of Zr, (2) the oxide of Nb, and (3) the oxide of Ta, the obtained activity becomes better. In addition, in the order of (1) the oxide of Ta, (2) the oxide of Nb, (3) the oxide of Zr and (4) the oxide of Ti, the obtained stability becomes better.

In the oxygen reduction catalyst according to the present embodiment, the size of the transition metal oxide is preferably smaller for the purpose of making the reaction surface area larger; thus, the size concerned preferably falls, for example, within a range from 1 nm to 100 nm.

The oxygen reduction catalyst according to the present embodiment is not particularly limited; generally known various conductive oxides such as indium/tin oxide (ITO), antimony/tin oxide (ATO), and perovskite type oxides such as $LaCoO_3$ and $LaNiO_3$ can be used. The conductive oxide may be the oxide(s) of at least one or more transition metals selected from the group consisting of Ti, Zr, Nb and Ta. As described above, in the oxygen reduction catalyst according to the present embodiment, the conductive oxide can function as a base material; the oxide having oxygen holes provided at least on the surface of the conductive oxide is the oxide(s) of at least one or more transition metals selected from the group consisting of Ti, Zr, Nb and Ta; accordingly, by using the same transition metal(s) as the transition metal(s) of the transition metal oxide(s), the conductive oxide and the oxide having oxygen holes can be prepared at a time without separately preparing the conductive oxide and the oxide having oxygen holes. Consequently, the production efficiency can be improved. Moreover, by preparing at a time the conductive oxide and the oxide having oxygen holes, the conductive oxide and the oxide having oxygen holes can be combined into a composite substance, and thus the oxygen reduction performance can be more improved.

In the oxygen reduction catalyst according to the present embodiment, the conductive oxide and the transition metal oxide having oxygen holes may be simultaneously formed as to form a composite substance, or alternatively, after the conductive oxide and the transition metal oxide having oxygen holes are separately prepared, the transition metal oxide having oxygen holes may be provided at least on the surface of the conductive oxide.

In the oxygen reduction catalyst according to the present embodiment, the conductive oxide may be $Ti_4O_7$, $Ti_3O_5$, $Ti_2O_3$, TiO, $Ti_3O_2$, ZrO, NbO or TaO. According to such a constitution, the electrical conductivity of the conductive oxide functioning as a base material is high, and the oxygen reduction performance can be more improved.

In the oxygen reduction catalyst according to the present embodiment, as the conductive oxide, a single substance can be used, or alternatively a mixture of a plurality of substances can also be used. As the transition metal oxide having oxygen holes, a single substance can be used, or alternatively a mixture of a plurality of substances can also be used.

The combination of the conductive oxide and the oxygen reduction catalyst is not particularly limited; however, a combination of the conductive oxide and the oxygen reduction catalyst including the same types of elements is more preferable. According to such a constitution, the boundary between the conductive oxide and the oxygen reduction catalyst provided on the surface of the conductive oxide is hardly formed to lead to a better composite structure, and accordingly the oxygen reduction performance is more improved. Specifically, when the conductive oxide is constituted with the oxide of Ti, the oxygen reduction catalyst is also more preferably constituted mainly with the oxide of Ti. In addition, when the conductive oxide is constituted with the oxide of Zr, the oxygen reduction catalyst is also more preferably constituted mainly with the oxide of Zr. In addition, when the conductive oxide is constituted with the oxide of Nb, the oxygen reduction catalyst is also more preferably constituted mainly with the oxide of Nb. In addition, when the conductive oxide is constituted with the oxide of Ta, the oxygen reduction catalyst is also more preferably constituted mainly with the oxide of Ta.

In the present embodiment, the shape into which the conductive oxide is formed is not particularly limited, and may be, for example, a plate-like shape, a spherical shape, a fibrous shape, a lamellar shape and a porous shape. The oxide having oxygen holes may be provided not only on the surface of the conductive oxide, but also in the interior of the conductive oxide. When the conductive oxide is formed in a porous shape, the oxide having oxygen holes is preferably provided on the surface of each of the pores.

(Method for Producing Oxygen Reduction Catalyst)

Next, a method for producing the oxygen reduction catalyst according to the present embodiment is described. First, (1) the conductive oxide and (2) the oxide selected from the group consisting of the oxides of Ti, Zr, Nb and Ta are prepared. Next, a mixture is prepared so as for the content of (1) the conductive oxide to be 50 to 95% by mass, and for the content of (2) the oxide selected from the group consisting of the oxides of Ti, Zr, Nb and Ta to be 5 to 50% by mass, and then, the mixture is mixed for 1 to 10 hours by using a ball mill or the like in such a way that the oxide selected from the group consisting of the oxides of Ti, Zr, Nb and Ta is supported at least on the surface of the conductive oxide. Successively, the mixture is heat treated in an inert gas atmosphere of 1 to 100% hydrogen, for 1 to 50 hours at 800 to 1300° C., to perform the reduction treatment of the mixture. The process performed in this way yields the oxygen reduction catalyst including the conductive oxide and the oxide(s), having oxygen holes and being provided at least on the surface of the conductive oxide, of at least one or more transition metals selected from the group consisting of Ti, Zr, Nb and Ta.

In the above-described production method, when as (1) the conductive oxide, for example, $TiO_2$ is used, the conductive oxide serving as the base material of the oxygen reduction catalyst obtained after the heat treatment is, for example, $Ti_4O_7$, $Ti_3O_5$, $Ti_2O_3$, TiO or $Ti_3O_2$. When as (1) the conductive oxide, for example, $ZrO_2$ is used, the conductive oxide serving as the base material of the oxygen reduction catalyst obtained after the heat treatment is, for example, ZrO. When as (1) the conductive oxide, for example, $Nb_2O_5$ is used, the conductive oxide serving as the base material of the oxygen reduction catalyst obtained after the heat treatment is, for example, NbO. When as (1) the conductive oxide, for example, $Ta_2O_5$ is used, the conductive oxide serving as the base material of the oxygen reduction catalyst obtained after the heat treatment is, for example, TaO.

In addition, (2) the oxide selected from the group consisting of the oxides of Ti, Zr, Nb and Ta determines the transition metal oxide having oxygen holes. When $ZrO_2$ is used, the transition metal oxide having oxygen holes is $ZrO_2$. When $Nb_2O_5$ is used, the transition metal oxide having oxygen holes is $NbO_{2-x}$. When $Ta_2O_5$ is used, the transition metal oxide having oxygen holes is $TaO_{2-x}$.

In the above-described production method, by the mixing with a ball mill or the like, (1) the conductive oxide is made to support a composite substance derived from (2) the oxide selected from the group consisting of the oxides of Ti, Zr, Nb and Ta. Specifically, for example, a mixture is prepared so as for the content of (1) $TiO_2$ to be 50 to 95% by mass and the content of (2) $Nb_2O_5$ to be 5 to 50% by mass, and by mixing the mixture with a ball mill or the like, $TiO_2$ is made to support a composite substance TiNbO. Successively, in an inert gas atmosphere of 1 to 100% hydrogen, the mixture in this state is heat treated at 800 to 1300° C., to perform the reduction treatment of the mixture, and thus, there is prepared an oxygen reduction catalyst in which a transition metal oxide having oxygen holes $NbO_{2-x}$, is provided at least on the surface of the conductive oxide $Ti_4O_7$. The notation $NbO_{2-x}$, represents a state in which the oxidation number of the metal ion comes to be locally lower than the maximum oxidation number because the substance formed as the active site is the composite oxide TiNbO, but oxygen holes are present in the composite oxide. In this case, by performing a heat treatment in an inert gas atmosphere of 1 to 100% hydrogen, the reduction is performed in a state of being suppressed in oxygen partial pressure, and consequently good oxygen holes can be provided in the transition metal oxide.

(Fuel Cell and Air Cell)

An air electrode can be prepared by using the oxygen reduction catalyst according to the present embodiment. The air electrode can be used in a fuel cell or an air cell. As the electrolyte of the fuel cell, it is possible to use an electrolyte having any characteristic of an acidic solution, an alkaline solution, a neutral solution and an organic solvent. As the fuel for a fuel cell, without being particularly limited, there can be used hydrogen, methanol or hydrogen compounds. Similarly, in the case of the air cell, the electrolyte and the negative electrode active material are not particularly limited. The above-described air electrode can also be used as the air electrode in a Li-air cell using a Li-containing substance as the negative electrode.

EXAMPLES

Hereinafter, the present invention is described in more detail by way of Examples, but the present invention is not limited to these Examples.

First, $TiO_2$ (particle size: 100 nm, manufactured by Somekawa Chemical Co., Ltd.) was prepared. Next, $Nb_2O_5$ (particle size: 1 μm, manufactured by Kojundo Chemical Laboratory Co., Ltd.), $Ta_2O_5$ (particle size: 10 nm, manufactured by Kojundo Chemical Laboratory Co., Ltd.) and $ZrO_2$ (particle size: 20 nm, manufactured by TECNAN Co., Ltd.) were respectively prepared. Next, mixtures were prepared so as for the content of (1) $TiO_2$ to be 80% by mass, and for the content of each of (2) $ZrO_2$, $Nb_2O_5$ and $Ta_2O_5$ to be 20% by mass, and then the mixtures were each mixed for 3 hours with the PLP-7 Planetary Ball Mill Premium Line manufactured by Fritsch Japan Co., Ltd. equipped with zirconia balls. Successively, each of the mixtures was calcined for reduction treatment in a nitrogen gas atmosphere containing 4% hydrogen, (4% $H_2/N_2$) for 40 hours at 1050° C., to prepare an oxygen reduction catalyst. In addition, by using only $TiO_2$, under the same conditions as described above, the treatment with the ball mill and the calcination treatment were performed.

(Powder X-Ray Diffraction)

For each of the oxygen reduction catalysts prepared in Example, the catalyst after the treatment with the ball mill and before the heat treatment (denoted as before calcination), and the catalyst after the calcination for 40 hours at 1050° C. (denoted by 40 h) were each subjected to a powder X-ray diffraction measurement by using the XRD (Ultima IV X-RAY DIFFRACTION METER, manufactured by Rigaku Corp.). The measurement results are shown in FIG. 1. From the powder X-ray diffraction measurement, in the catalyst using $ZrO_2$ as (2), the composite oxide phase containing the $ZrO_{2-x}$ structure was verified to be formed. In the catalyst using $Nb_2O_5$ as (2), the oxide phase containing the $NbO_2$, structure was also verified to be formed. In the catalyst using $Ta_2O_5$ as (2), the oxide phase containing the $TaO_2$, structure was also verified to be formed. In the catalyst using only $TiO_2$, the oxide phase containing the $TiO_2$, structure was also verified to be formed.

(XPS Measurement)

Figure 3:
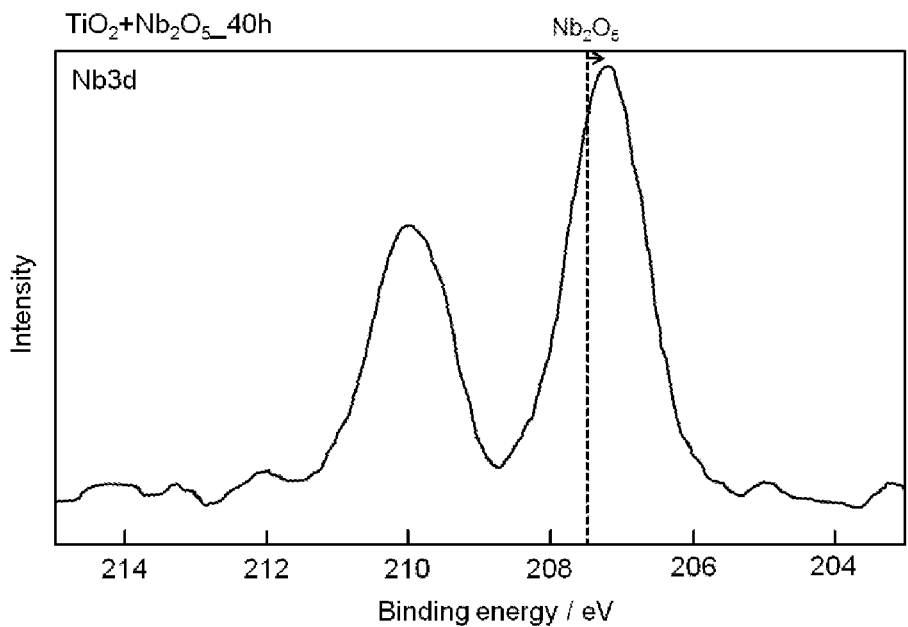
FIG. 3 is an XPS measurement graph of an oxygen reduction catalyst ($TiO_2+Nb_2O_5$) after calcination for 40 hours at 1050° C. in the oxygen reduction ability evaluation test 1 in Example.
Figure 4:
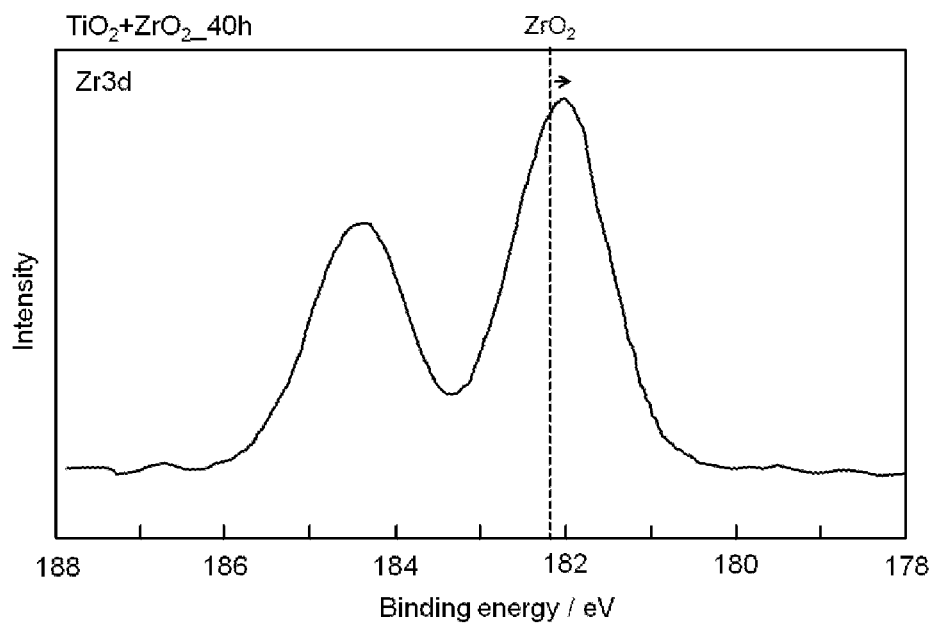
FIG. 4 is an XPS measurement graph of an oxygen reduction catalyst ($TiO_2+ZrO_2$) after calcination for 40 hours at 1050° C. in the oxygen reduction ability evaluation test 1 in Example.
Figure 5:
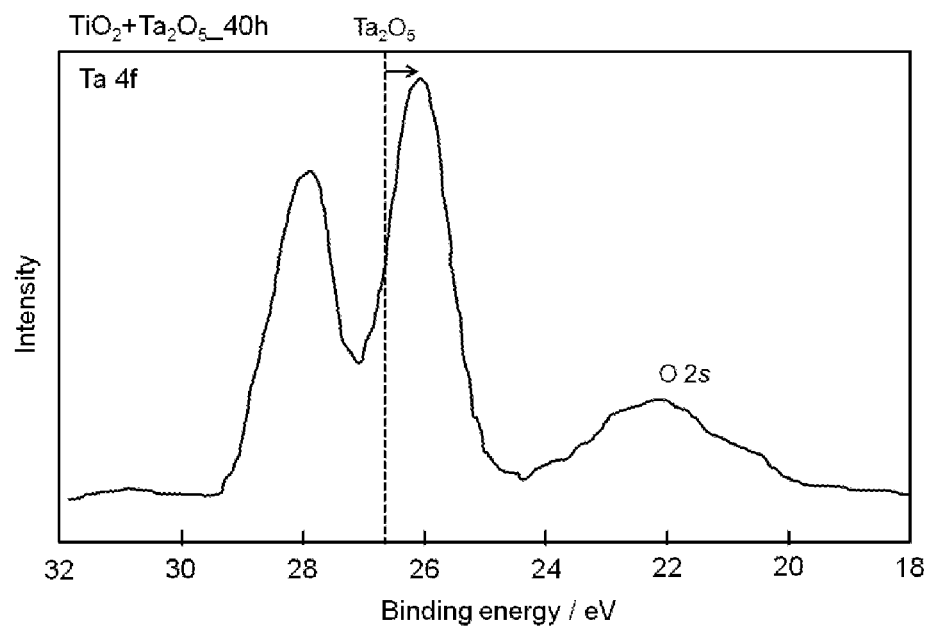
FIG. 5 is an XPS measurement graph of an oxygen reduction catalyst ($TiO_2+Ta_2O_5$) after calcination for 40 hours at 1050° C. in the oxygen reduction ability evaluation test 1 in Example.

Each of the oxygen reduction catalysts prepared in Example, after calcination for 40 hours at 1050° C. was subjected to an XPS measurement by using an XPS measurement apparatus (Model PHI Quantum-2000, manufactured by Ulvac-Phi, Inc.). The measurement results are shown in FIGS. 3 to 5.

(Evaluation of Oxygen Reduction Ability)

From each of the oxygen reduction catalysts prepared in Examples, 10 mg of the catalyst before the oxide heat treatment and 10 mg of the catalyst after the heat treatment for 40 hours were sampled; each of the resulting samples was added to a mixed solution composed of 16.6 μL of 5% by mass Nafion (trademark) and 428.4 μL of a 1-hexanol solution to prepare a catalyst ink. Next, each of the catalyst inks was dispersed by ultrasonic treatment, and then dropwise placed on a mirror-treated glassy carbon (GC, ϕ0.2 mm, manufactured by Tokai Carbon Co., Ltd.) in a target amount of 0.15 mg in terms of the amount of catalyst supported inclusive of the support; then the glassy carbon was dried in a thermostatic chamber set at 60° C. to prepare a working electrode.

Oxygen Reduction Ability Evaluation Test 1

Figure 2:
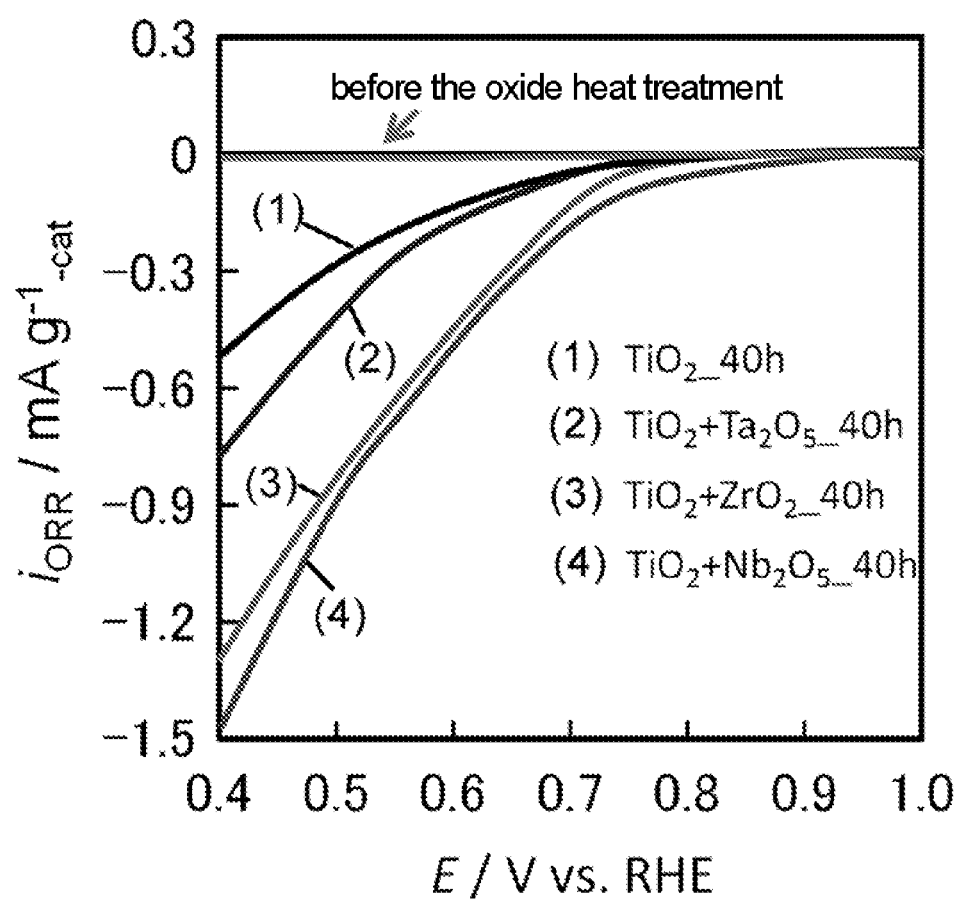
FIG. 2 is a graph showing the relation between the electric current per unit mass of the catalyst inclusive of the support and the electric potential of the oxygen reduction reaction in each of the catalysts in the oxygen reduction ability evaluation test 1 in Example.

Next, as an oxygen reduction ability evaluation test 1, a three-electrode cell saturated with nitrogen was prepared by using 0.1 mol/dm$^3$ H$_2$SO$_4$ as an electrolyte and by setting the temperature at 30±5° C. The reference electrode was a reversible hydrogen electrode (RHE), and the counter electrode was a glassy carbon plate. As a pretreatment, in an oxygen atmosphere, 300 cycles of cyclic voltammetry (CV) were performed at a scanning rate of 150 mV/s, in a range from 0.05 to 1.2 V vs. RHE. Subsequently, three cycles of slow scan voltammetry (SSV) were performed at a scanning rate of 5 mV/s, in a range from 0.2 to 1.2 V vs. RHE in each of an oxygen atmosphere and a nitrogen atmosphere. An oxygen reduction current density $i_{ORR}$ was calculated by subtracting the current density in the background in the nitrogen atmosphere from the current density in the oxygen atmosphere obtained from the 3rd cycle of SSV. By using the calculated results, FIG. 2 shows the relation between the electric current per unit mass of the catalyst inclusive of the support and the electric potential of the ORR (oxygen reduction reaction). According to FIG. 2, in any of the catalysts before the oxide heat treatment, no electric current flowed. In any of the catalysts after calcination, already from 0.9 V vs. RHE, the oxygen reduction started, showing that the catalysts concerned were high in activity. In particular, the case where an oxygen reduction catalyst prepared by the combination of TiO$_2$+Nb$_2$O$_5$ was used was found to be the highest in the oxygen reduction ability.

As can be seen from FIG. 2, by performing the heat treatment, the composite substance formation prevailed over the whole of the mixture, and the transition metal oxide having oxygen holes was produced at least on the surface of the conductive oxide Ti$_4$O$_7$. This is ascribable to the fact that the oxygen reduction reaction can occur only on the catalyst surface, and the acquirement itself of the catalytic activity as shown in FIG. 2 indicates the presence of the active sites (oxygen holes) on the surface.

Moreover, according to FIGS. 3 to 5, in each of the oxygen reduction catalysts, any of the elements (Nb, Zr, and Ta) exhibited a peak shifted to the lower energy side than the peak of the oxide free from holes (Nb$_2$O$_5$, ZrO$_2$, or Ta$_2$O$_5$), indicating that the element concerned was in a reduced state.

Oxygen Reduction Ability Evaluation Test 2

By using the oxygen reduction catalyst (the (4) oxygen reduction catalyst in FIG. 2) prepared with TiO$_2$ and Nb$_2$O$_5$ in one of Examples, the same evaluation as in the above-described oxygen reduction ability evaluation test 1 was performed twice (1st, 2nd), and the oxygen reduction current densities $i_{ORR}$ were calculated. By using the calculated results, FIG. 6 shows the relation between the current per unit mass of the catalyst inclusive of the support and the electric potential of the ORR (oxygen reduction reaction).

Figure 6:
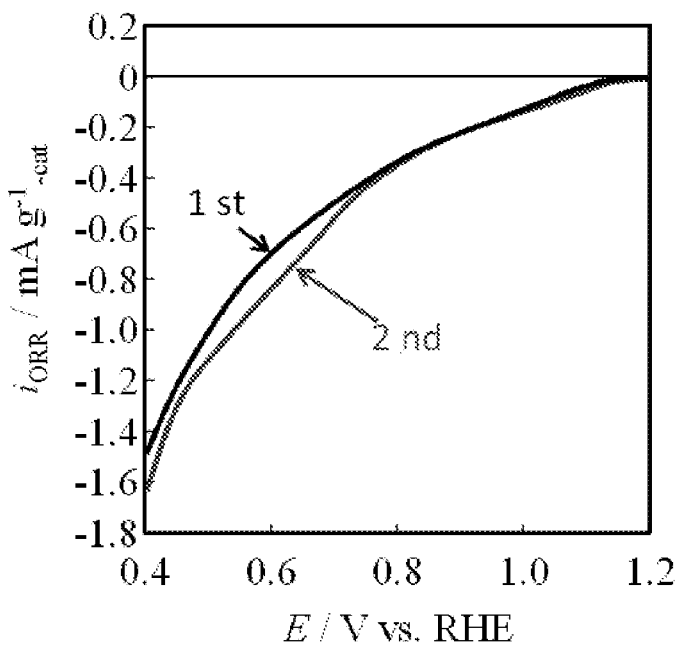
FIG. 6 is a graph showing the relation between the electric current per unit mass of the catalyst inclusive of the support and the electric potential of the oxygen reduction reaction in a catalyst in the oxygen reduction ability evaluation test 2 in Example.

According to FIG. 6, when the oxygen reduction catalyst prepared with TiO$_2$ and Nb$_2$O$_5$ was used, the starting potential was found to be 1.1 V, to lead to a better result as compared with the case (the starting potential: 1.05 V) where Pt was used as an oxygen reduction catalyst.

Oxygen Reduction Ability Evaluation Test 3

For the oxygen reduction catalyst (the (4) oxygen reduction catalyst in FIG. 2) prepared with TiO$_2$ and Nb$_2$O$_5$ in one of Examples, 20000 cycles of a start-stop test were performed at 30° C. (room temperature was assumed) by using 0.1 mol/dm$^3$ H$_2$SO$_4$ as an electrolyte, and by using a triangle wave having a test voltage varying between 1.0 and 1.5 V vs. RHE, and a potential scanning rate of 500 mV/s. Next, for the oxygen reduction catalyst concerned, the same evaluation as the oxygen reduction ability evaluation test 1 was also performed for the samples after 0 cycle and 20000 cycles, respectively, and the oxygen reduction current densities $i_{ORR}$ were calculated. By using the calculated results, FIG. 7 shows the relation between the current per unit mass of the catalyst inclusive of the support and the electric potential of the ORR (oxygen reduction reaction).

Figure 7:
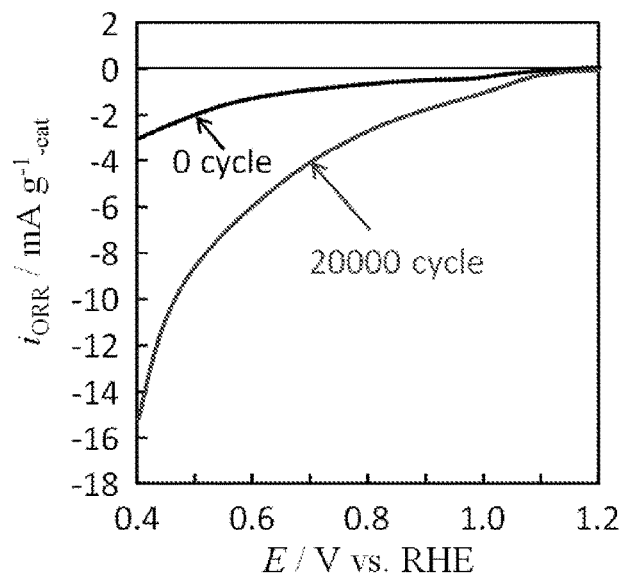
FIG. 7 is a graph showing the relation between the electric current per unit mass of the catalyst inclusive of the support and the electric potential of the oxygen reduction reaction in a catalyst in the oxygen reduction ability evaluation test 3 (start-and-stop test) in Example.

As can be seen from FIG. 7, even after 20000 cycles, the oxygen reduction ability of the oxygen reduction catalyst was not degraded.

Oxygen Reduction Ability Evaluation Test 4

For the oxygen reduction catalyst (the (4) oxygen reduction catalyst in FIG. 2) prepared with TiO$_2$ and Nb$_2$O$_5$ in one of Examples, 20000 cycles of a start-stop test were performed at 80° C. (actual operation conditions of a fuel cell were assumed) by using 0.1 mol/dm$^3$ H$_2$SO$_4$ as an electrolyte, and by using a triangle wave having a test voltage varying between 1.0 and 1.5 V vs. RHE, and a potential scanning rate of 500 mV/s. Next, for the oxygen reduction catalyst concerned, the same evaluation as the oxygen reduction ability evaluation test 1 was also performed for the samples after 0 cycle, 3000 cycles, 5000 cycles, 10000 cycles and 20000 cycles, respectively, and the oxygen reduction current densities $i_{ORR}$ were calculated. By using the calculated results, FIG. 8 shows the relation between the current of the ORR (oxygen reduction reaction) per unit mass of the catalyst inclusive of the support and the number of cycles, and the relation between the electric quantity of the ORR and the number of cycles.

Figure 8:
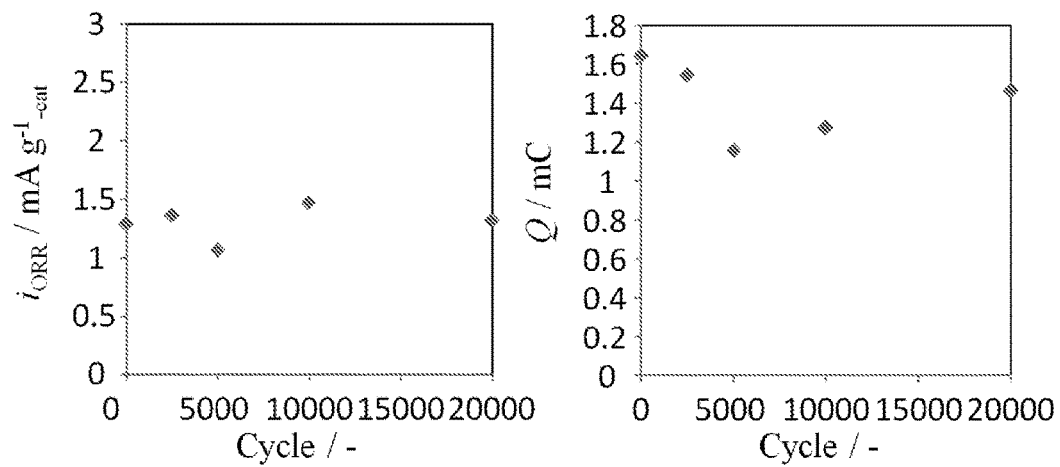
FIG. 8 is a graph showing the relation between each of the cycles and the electric current of the oxygen reduction reaction in the oxygen reduction ability evaluation test 4 (start-and-stop test) in Example.

As can be seen from FIG. 8, the activity was nearly constant over the samples after the individual numbers of cycles, and the electric quantity was little varied among the samples after the individual numbers of cycles.

Oxygen Reduction Ability Evaluation Test 5

Figure 9:
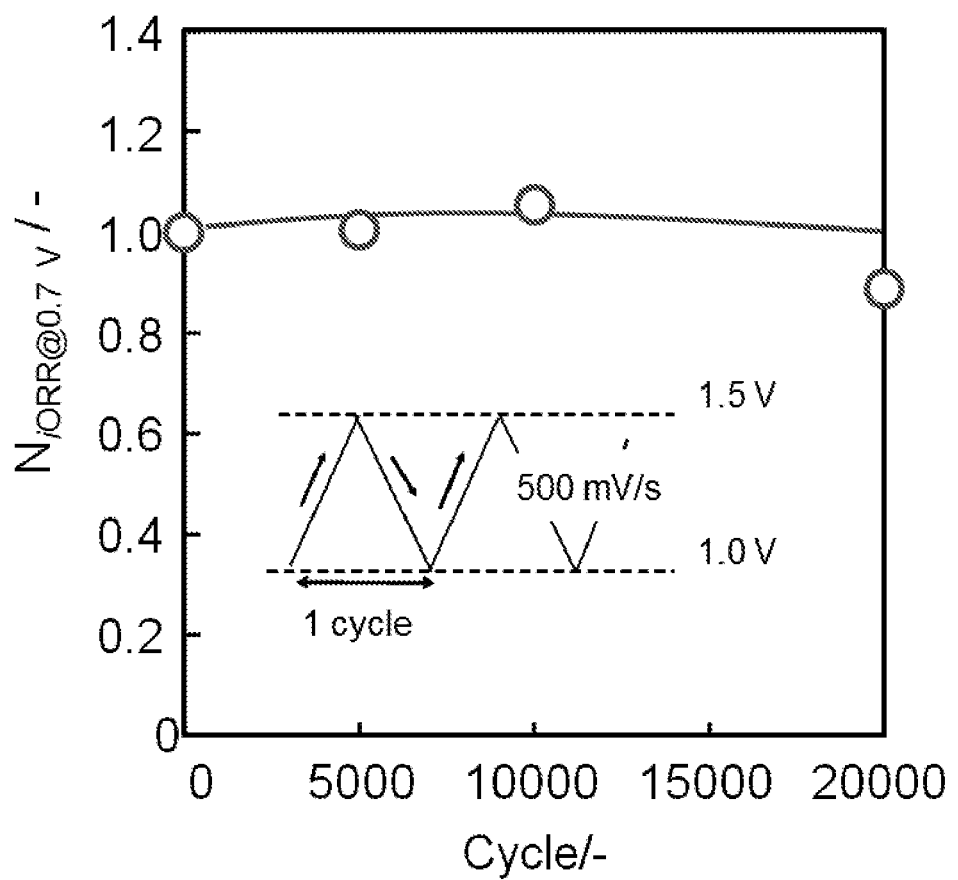
FIG. 9 is a graph showing the relation between each of the cycles and the electric potential of the oxygen reduction reaction in the oxygen reduction ability evaluation test 5 (start-and-stop test) in Example.

For the oxygen reduction catalyst (the (4) oxygen reduction catalyst in FIG. 2) prepared with TiO$_2$ and Nb$_2$O$_5$ in one of Examples, 20000 cycles of a start-stop test were performed at 80° C. (actual operation conditions of a fuel cell were assumed) by using 0.1 mol/dm$^3$ H$_2$SO$_4$ as an electrolyte, and by using a triangle wave having a test voltage varying between 1.0 and 1.5 V vs. RHE, and a potential scanning rate of 500 mV/s. Next, for the oxygen reduction catalyst concerned, the same evaluation as the oxygen reduction ability evaluation test 1 was also performed for the samples after 0 cycle, 5000 cycles, 10000 cycles and 20000 cycles, respectively, and the oxygen reduction current densities $i_{ORR}$ were calculated. FIG. 9 shows the ratios of the oxygen reduction current densities at 0.7 V vs. RHE per unit mass of the catalyst inclusive of the support at the respective numbers of cycles to the oxygen reduction current density at 0.7 V vs. RHE at 0 cycle.

As can be seen from FIG. 9, the catalytic activity of the oxygen reduction catalyst of Example was not degraded after cycles in relation to the oxygen reduction current density (0.7 V vs. RHE) at the 0 cycle.

Oxygen Reduction Ability Evaluation Test 6

Figure 10:
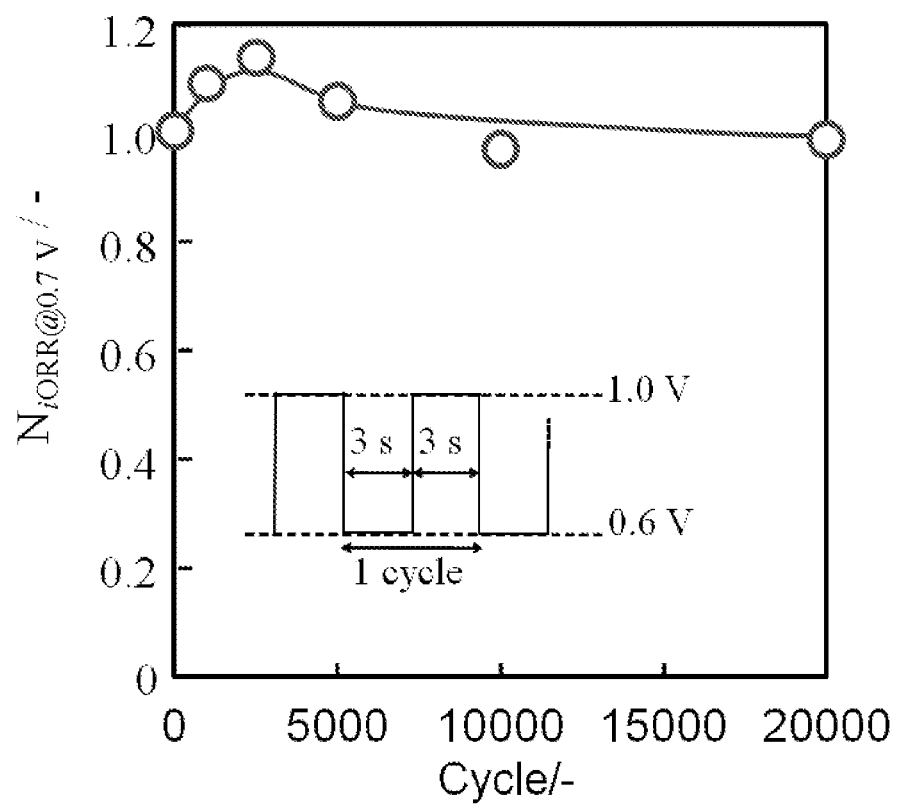
FIG. 10 is a graph showing the relation between each of the cycles and the electric potential of the oxygen reduction reaction in the oxygen reduction ability evaluation test 6 (load response test) in Example.

For the oxygen reduction catalyst (the (4) oxygen reduction catalyst in FIG. 2) prepared with TiO$_2$ and Nb$_2$O$_5$ in one of Examples, 20000 cycles of a load-response test were performed at 80° C. (actual operation conditions of a fuel cell were assumed) by using 0.1 mol/dm$^3$ H$_2$SO$_4$ as an electrolyte, and by using a rectangular wave having a test voltage varying between 0.6 and 1.0 V vs. RHE, and a voltage holding time of 3 seconds. Next, for the oxygen reduction catalyst concerned, the same evaluation as the oxygen reduction ability evaluation test 1 was also performed for the samples after 0 cycle, 1000 cycles, 2500 cycles, 5000 cycles, 10000 cycles and 20000 cycles, respectively, and the oxygen reduction current densities $i_{ORR}$ were calculated. FIG. 10 shows the ratios of the oxygen reduction current densities at 0.7 V vs. RHE per unit mass of the catalyst inclusive of the support at the respective numbers of cycles to the oxygen reduction current density at 0.7 V vs. RHE at 0 cycle.

As can be seen from FIG. 10, the catalytic activity of the oxygen reduction catalyst of Example was not degraded after cycles in relation to the oxygen reduction current density (0.7 V vs. RHE) at the 0 cycle.

The invention claimed is:

1. An oxygen reduction catalyst comprising:
a conductive oxide; and
an oxide(s), having oxygen holes and provided at least on the surface of the conductive oxide, of at least one or more transition metals selected from the group consisting of Ti, Zr, Nb and Ta.

2. The oxygen reduction catalyst according to claim 1, wherein the oxide of the transition metal is represented by $TiO_{2-x}$, $ZrO_{2-x}$, $NbO_{2-x}$ or $TaO_{2-x}$, with the proviso that $0<x\leq0.2$.

3. The oxygen reduction catalyst according to claim 1, wherein the conductive oxide is an oxide(s) of at least one or more transition metals selected from the group consisting of Ti, Zr, Nb and Ta.

4. The oxygen reduction catalyst according to claim 3, wherein the conductive oxide is $Ti_4O_7$, $Ti_3O_5$, $Ti_2O_3$, TiO, $Ti_3O_2$, ZrO, NbO or TaO.

5. The oxygen reduction catalyst according to claim 3, wherein the conductive oxide and the oxide of the transition metal are formed so as to form a composite substance.

6. A fuel cell comprising the oxygen reduction catalyst according to claim 1 as an air electrode.

7. An air cell comprising the oxygen reduction catalyst according to claim 1 as an air electrode.

8. A method for producing the oxygen reduction catalyst according to claim 1, comprising mixing 5 to 50% by mass of an oxide selected from the group consisting of the oxides of Ti, Zr, Nb and Ta with 50 to 95% by mass of a conductive oxide so as to be supported at least on the surface of the conductive oxide to prepare a mixture, and then performing a heat treatment of the mixture in an inert gas atmosphere of 1 to 100% of hydrogen at 800 to 1300° C.

* * * * *